United States Patent
Xue et al.

(10) Patent No.: US 8,646,081 B1
(45) Date of Patent: Feb. 4, 2014

(54) METHOD AND SYSTEM TO DETECT A SECURITY EVENT IN A PACKET FLOW AND BLOCK THE PACKET FLOW AT AN EGRESS POINT IN A COMMUNICATION NETWORK

(75) Inventors: Wen Xue, Overland Park, KS (US); Tong Zhou, Haddonfield, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 1351 days.

(21) Appl. No.: 11/872,171

(22) Filed: Oct. 15, 2007

(51) Int. Cl.
*H04L 29/06* (2006.01)

(52) U.S. Cl.
USPC .................. 726/24; 726/13; 726/22; 713/188

(58) Field of Classification Search
USPC .......................................................... 726/24
See application file for complete search history.

(56) References Cited

U.S. PATENT DOCUMENTS

| | | | |
|---|---|---|---|
| 5,802,144 A * | 9/1998 | Laird et al. | 379/32.04 |
| 6,988,208 B2 | 1/2006 | Hrabik et al. | |
| 7,062,553 B2 | 6/2006 | Liang | |
| 7,523,493 B2 * | 4/2009 | Liang et al. | 726/13 |
| 7,610,624 B1 * | 10/2009 | Brothers et al. | 726/24 |
| 7,716,330 B2 * | 5/2010 | Kulig et al. | 709/225 |
| 2002/0178383 A1 | 11/2002 | Hrabik et al. | |
| 2003/0115483 A1 | 6/2003 | Liang | |
| 2004/0250158 A1 | 12/2004 | Le Pennec et al. | |
| 2004/0255167 A1 | 12/2004 | Knight | |
| 2005/0204404 A1 | 9/2005 | Hrabik et al. | |
| 2006/0212572 A1 | 9/2006 | Afek et al. | |
| 2006/0212932 A1 | 9/2006 | Patrick et al. | |

OTHER PUBLICATIONS

Dantu, Ram, and Joao W. Cangussu. "Fast Worm Containment Using Feedback Control." IEEE Transactions on Dependable and Secure Computing, vol. 4, No. 2, Apr.-Jun. 2007.*

* cited by examiner

*Primary Examiner* — Taghi Arani
*Assistant Examiner* — Narciso Victoria

(57) ABSTRACT

An ingress point receives a packet flow from a first communication device. The ingress point copies the packet flow, transmits the packet flow to an egress point over a network path, and processes the copy to determine if the packet flow represents a security event. If the packet flow represents a security event, the ingress point transmits a blocking instruction to the egress point over an alarm link and the egress point blocks the packet flow representing the security event. If the packet flow does not represent a security event, the egress point transmits the packet flow to a second communication device.

16 Claims, 7 Drawing Sheets

US 8,646,081 B1

METHOD AND SYSTEM TO DETECT A SECURITY EVENT IN A PACKET FLOW AND BLOCK THE PACKET FLOW AT AN EGRESS POINT IN A COMMUNICATION NETWORK

BACKGROUND OF THE INVENTION

1. Field of the Invention

The invention is related to the field of communications, and in particular, to a communication network that detects and blocks a packet flow representing a security event.

2. Description of the Prior Art

Existing virus control systems consist of an Intrusion Detection System (IDS) acting as a virus filter directly on a call path. Unfortunately, this system causes a delay in the real-time traffic flow because the traffic is delayed for inspection at the IDS. Another existing virus control system detects a virus at an ingress point after an infected packet has been sent into the communication network. This system allows malicious traffic to traverse the communication network and infect an egress point and an external user before the virus is detected.

Other existing network security systems detect viruses in the network and then take measures to contain the infection and remove the virus. When a virus is detected in one region, the infected region sends the virus information to a central management node. The central management node distributes the virus information and cleaning software to all of the regional nodes. The regional nodes then block any further communication that contains the virus. A drawback to this system is that the virus must infect a portion of the system before it can be contained, removed from the infected regions, and blocked from other regions. The infection is often contained by quarantining an infected area or even bringing down the network. Unfortunately, this approach shuts down communication with the network or the quarantined area until the virus is removed and there is no further possibility of spreading the infection.

SUMMARY OF THE INVENTION

A communication network described herein helps solve the problems described above. The communication network detects a virus at an ingress point of the network and then blocks the virus at an egress point before it reaches its destination. The communication network utilizes a high-speed alarm link to transmit a blocking instruction from the ingress point to the egress point. In some embodiments, the blocking instruction reaches the egress point before the infected packet flow to prevent spreading the infection.

In some embodiments, the communication network detects, blocks, and removes the virus before any part of the network becomes infected. In some embodiments, the egress point transmits a security message to the destination address warning that an infected communication was intercepted. In some embodiments, the egress point removes the virus from the infected communication and transmits a virus-free communication to the destination address.

In some embodiments, the communication network detects and blocks viruses in real-time using the high-speed alarm link. Some embodiments of the invention reduce the need to bring down or quarantine the network and reduce traffic delays caused by virus inspection and filtering.

DETAILED DESCRIPTION OF THE PREFERRED EMBODIMENT

Figure 1:
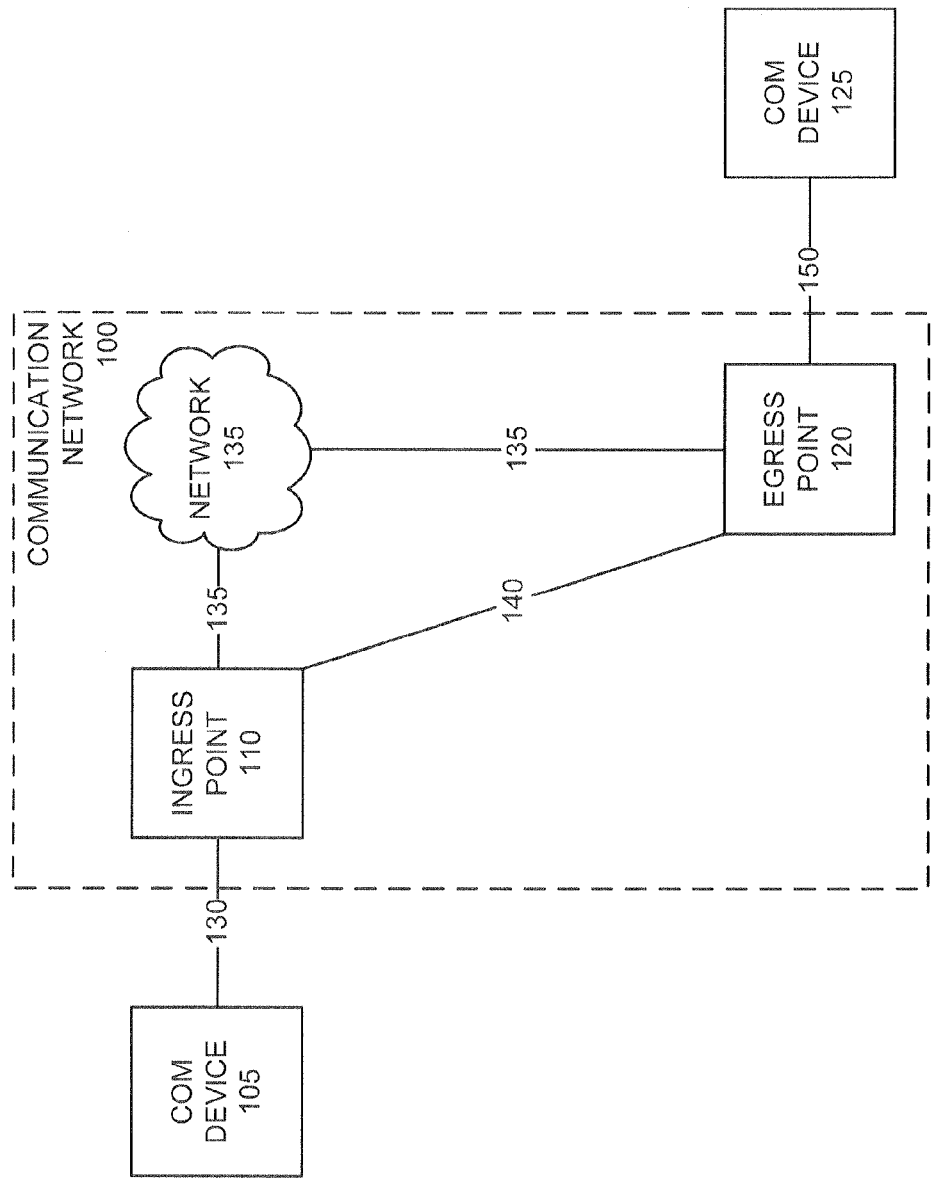
FIG. 1 illustrates a communication network in an embodiment of the invention.

FIG. 1 illustrates communication network 100 in an embodiment of the invention. Communication network 100 detects a security event in a packet flow and blocks the packet flow representing the security event. Communication network 100 comprises ingress point 110, egress point 120, and network 135. Ingress point 110 communicates with communication device 105 over link 130. Egress point 120 communicates with communication device 125 over link 150. Communication devices 105 and 125 comprise telephones, computers, personal digital assistants, Internet appliances, wireless transceivers, or some other communication device. Links 130 and 150 may be direct wireless or wireline links or may comprise various intermediate systems and components.

Ingress point 110 and egress point 120 comprise gateways, routers, computer systems, wireless transceivers, or some other type of communication device. Ingress point 110 and egress point 120 communicate over network 135 and alarm link 140. Network 135 comprises an application server configured to process business logic, such as authentication, authorization, service, and billing. Network 135 could also comprise a network path or some other form of communication media. Alarm link 140 comprises a high-speed routing system, a direct link, or some other form of communication link optimized for speed relative to network 135.

Ingress point 110 receives a packet flow from communication device 105 over link 130. The packet flow comprises a series of packets having the same source and destination addresses or some other code that can be used to associate the packets in the series. The packet flow comprises a text message, email message, Short Message Service (SMS) message, voice data, or some other form of data communication. Ingress point 110 copies the packet flow, and transmits the packet flow to egress point 120 over network 135. Ingress point 110 processes the copy of the packet flow to determine if the packet flow represents a security event. A security event comprises a virus, malicious code, Denial of Service (DoS) attacks, or other unsecured network activity. If the packet flow represents a security event, then ingress point 110 translates a destination address of the packet flow to identify egress point 120 and transmits a blocking instruction for the packet flow to egress point 120 over alarm link 140.

In response to receiving the blocking instruction, egress point 120 blocks the packet flow representing the security event. If the packet flow does not represent a security event, then egress point 120 transmits the packet flow to communication device 125 over link 150.

The blocking instruction typically reaches the egress point before the packet flow reaches the egress point. Alarm link 140 transmits at a faster rate than network 135. Thus, while the packet flow is traversing network 135, ingress point 110 checks the packet flow for a security event and sends a blocking instruction to egress point 120. The blocking instruction is transmitted over high-speed alarm link 140 and, in most instances, reaches egress point 120 before the packet flow reaches egress point 120 over network 135.

Figure 2:
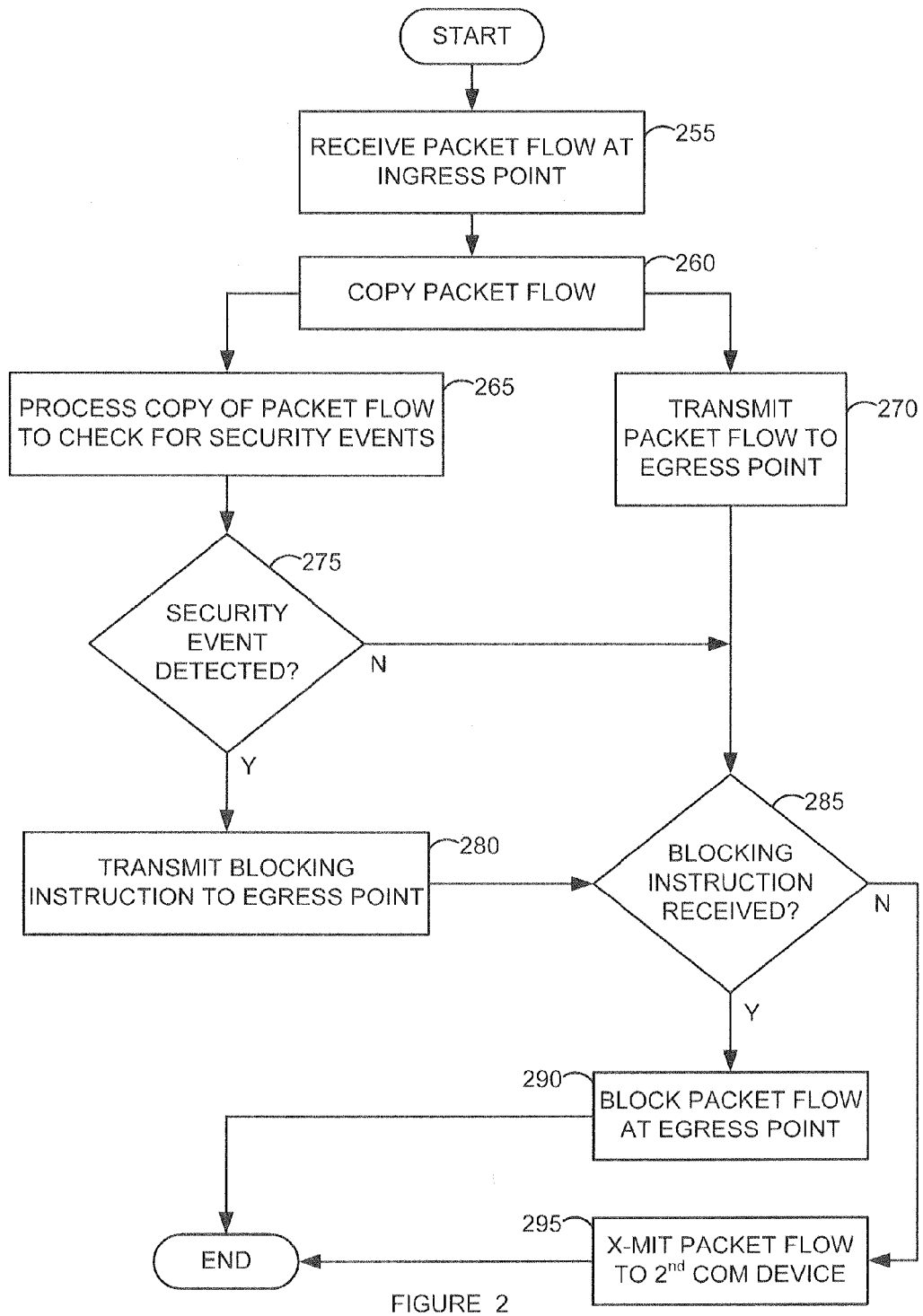
FIG. 2 illustrates the operation of a communication network in an embodiment of the invention.

FIG. 2 illustrates the operation of communication system 100 in an embodiment of the invention. The reference numbers from FIG. 2 are indicated parenthetically below. Ingress point 110 receives a packet flow (255) and copies the packet flow (260). Ingress point 110 then transmits the packet flow to egress point 120 (270) and processes the copy of the packet flow to check for security events (265).

If the packet flow represents a security event (275), then ingress point 110 transmits a blocking instruction to egress point 120 (280). If a blocking instruction is received at egress point 120 (285), then egress point 120 blocks the packet flow (290). Otherwise, egress point 120 transmits the packet flow to communication device 125 (295).

Figure 3:
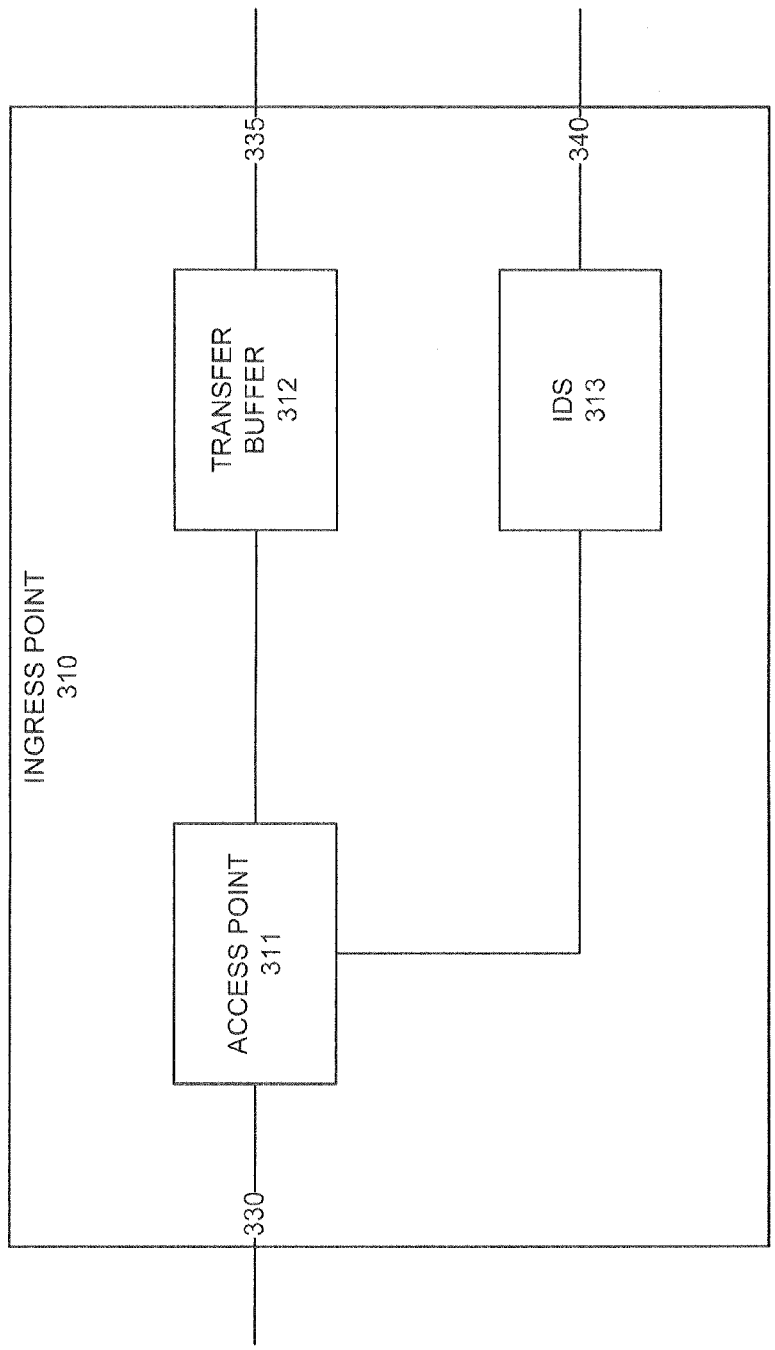
FIG. 3 illustrates an ingress point in an embodiment of the invention.

FIG. 3 illustrates ingress point 310 in an embodiment of the invention. Ingress point 310 comprises access point 311, transfer buffer 312, and Intrusion Detection System (IDS) 313. Access point 311 communicates with a communication device (not shown) over link 330. Link 330 may be a direct wireless or wireline link or may comprise various intermediate systems and components. Access point 311 is linked to transfer buffer 312 and IDS 313.

Access point 311 receives a packet flow from the communication device over link 330. Access point 311 copies the packet flow and transmits the packet flow to transfer buffer 312. Transfer buffer 312 transmits the packet flow to an egress point (not shown) over network 335. Network 335 comprises an application server configured to process business logic, such as authentication, authorization, service, and billing. Network 335 could also comprise a network path or some other form of communication media.

Access point 311 also transmits the copy of the packet flow to IDS 313. IDS 313 comprises circuitry and software that detects a security event. A security event comprises a virus, malicious code, Denial of Service (DoS) attacks, or other unsecured network activity. IDS 313 processes the copy of the packet flow to determine if the packet flow represents a security event. If a security event is detected, then IDS 313 transmits a blocking instruction to the egress point (not shown) over alarm link 340. Alarm link 340 comprises a high-speed routing system, a direct link, or some other form of communication link optimized for speed relative to network 335.

Figure 4:
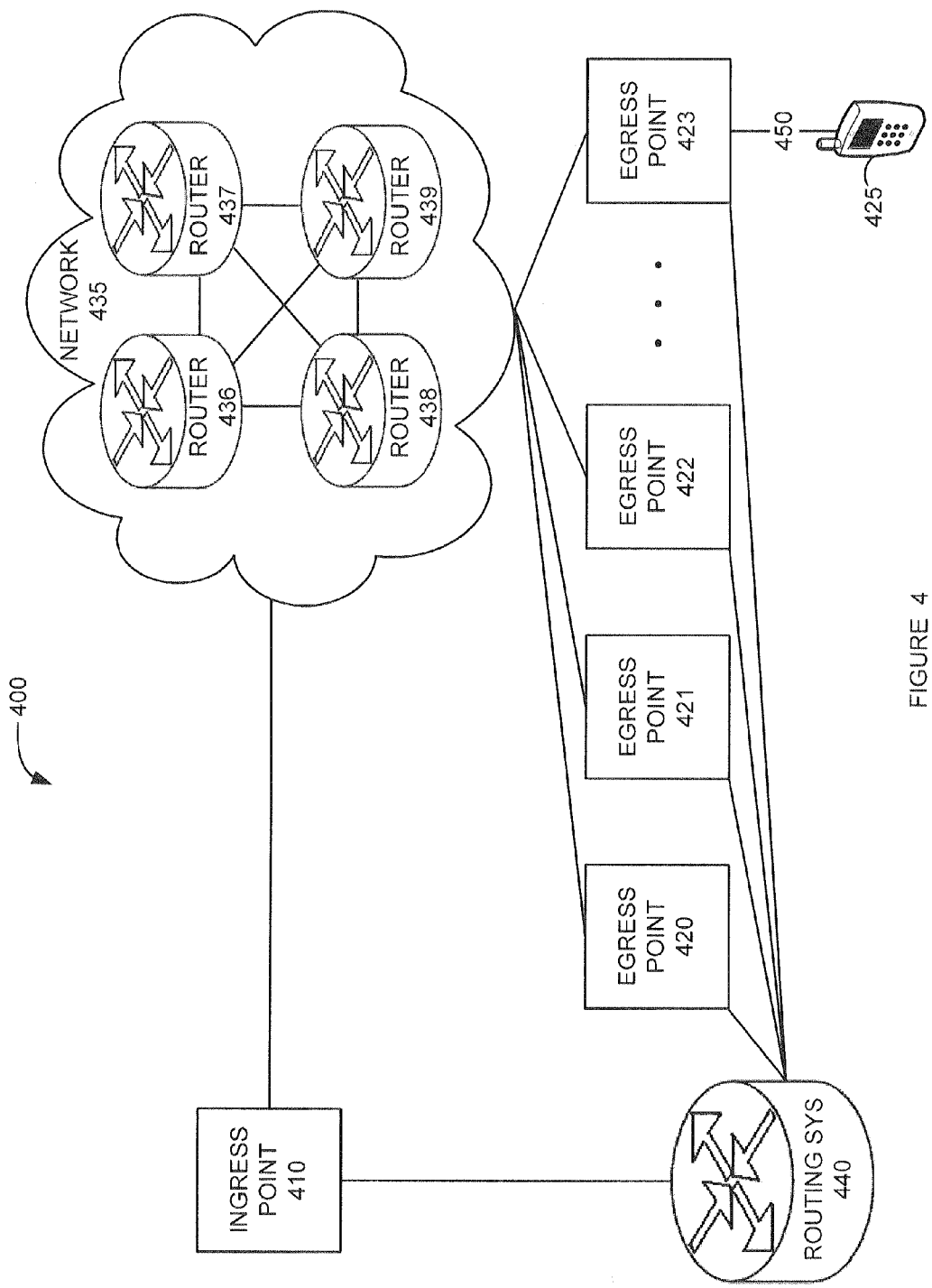
FIG. 4 illustrates a communication network in an embodiment of the invention.

FIG. 4 illustrates communication network 400 in an embodiment of the invention. Communication network 400 comprises ingress point 410, routing system 440, network 435, egress points 420-423 and communication device 425. Network 435 comprises routers 436-439. In some embodiments, network 435 comprises an application server configured to process business logic, such as authentication, authorization, service, and billing. Network 435 could also comprise a network path or some other form of communication media. Ingress point 410 communicates with egress points 420-423 via network 435 and routing system 440. Egress point 423 communicates with communication device 425 over link 450.

Ingress point 410 receives a packet flow from a communication device. Ingress point 410 copies the packet flow and transmits the packet flow to one of egress points 420-423 via network 435. Ingress point 410 processes the copy of the packet flow to determine if the packet flow represents a security event. If the packet flow represents a security event, then ingress point 410 transmits an alarm instruction indicating a destination address, an identity of a sending communication device, and an identity of a receiving communication device to routing system 440. The identity of a communication device comprises a telephone number, Internet Protocol (IP) port, IP address, or any other unique identifier. Routing system 440 comprises a router, or some other form of communication system optimized for speed relative to network 435.

Routing system 440 translates the destination address to identify the proper one of egress points 420-423 for the receiving communication device. Routing system 440 contains data that associates each communication device with an egress point. For example, routing system 440 might contain a table of communication device IP ports and the current corresponding egress points. Routing system 440 is updated in real-time as the physical location of the communication device changes so that the proper egress point is identifiable at any time.

After routing system 440 receives the alarm instruction from ingress point 410 and identifies the proper one of egress points 420-423, routing system 440 transmits the blocking instruction and the identities of the communication devices to the proper one of egress points 420-423. An IDS in the proper one of egress points 420-423 receives the blocking instruction from routing system 440, and in response, blocks the corresponding packet flow. For example, if egress point 423 receives a blocking instruction from routing system 440 identifying a packet flow by sending and receiving IP addresses, then the IDS in egress point 423 blocks all packet flows associated with the IP address pair for a period of time or until the block is disabled by an administrator.

If the security event comprises a virus, then egress point 423 processes the packet flow to remove the virus from the packet flow and then transmits the packet flow to communication device 425 over link 450.

Egress point 423 transmits a security message to communication device 425 over link 450 if a blocking instruction is received. The security message comprises a warning message stating that a packet flow with a security event was intercepted, the identity of the sending communication device, and a virus removal application for use if communication device 425 receives a packet flow from the identified sending communication device within a period of time. The security message also instructs communication device 425 to check for recent packet flows already received from the identified sending communication device and, if found, then process the packet flow to remove the virus from the packet flow.

In some embodiments, the blocking instruction remains active until a specified period of time has passed.

In some embodiments, the security message remains active until it is disabled by an administrator or until a specified period of time has passed.

In some embodiments, routing system 440 transmits the blocking instruction and the identities of the sending and receiving communication devices to a plurality of egress points in communication network 400. Each egress point then blocks all packet flows associated with the identified communication device pair for a period of time.

Figure 5:
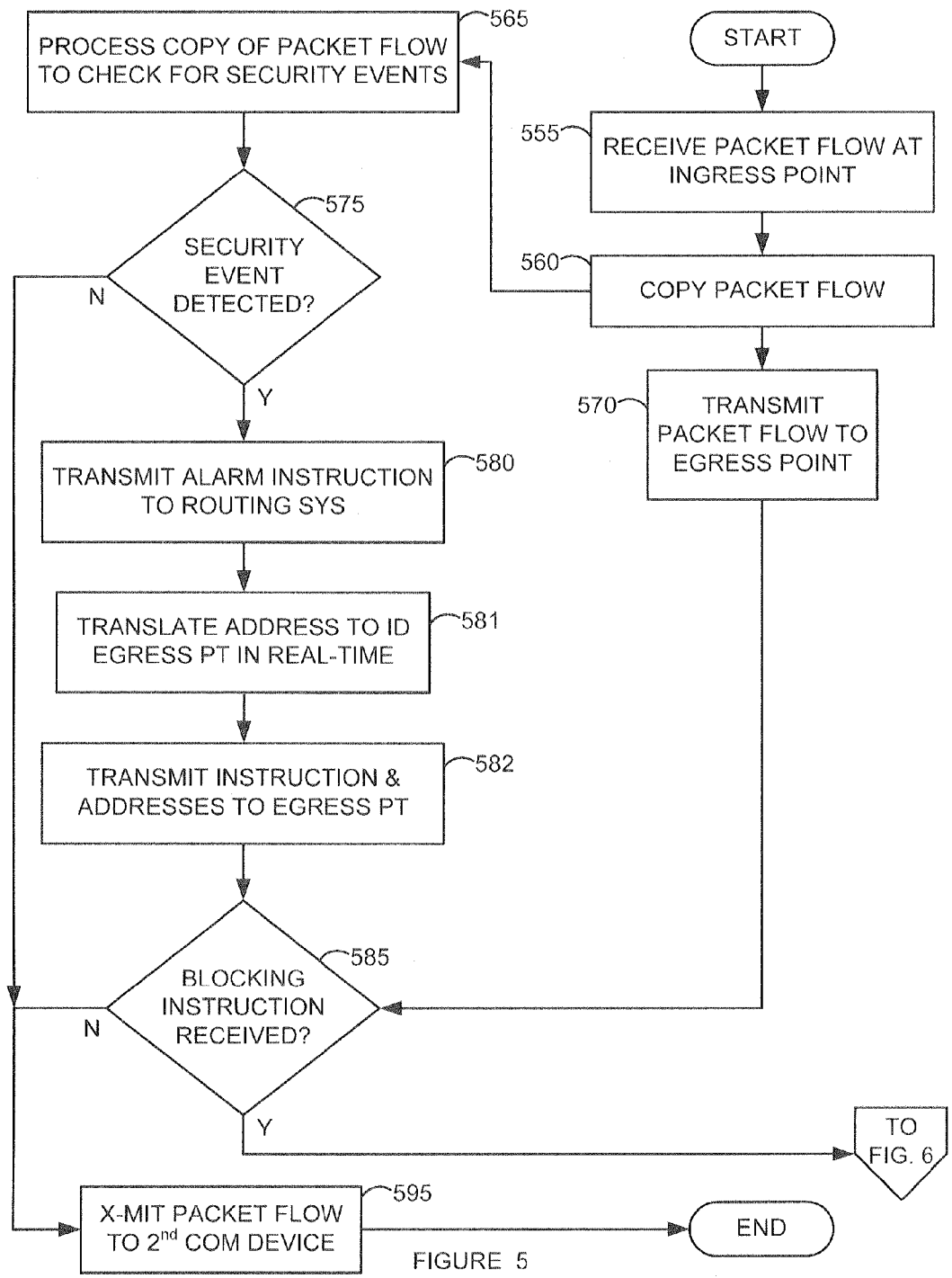
FIG. 5 illustrates the operation of a communication network in an embodiment of the invention.
Figure 6:
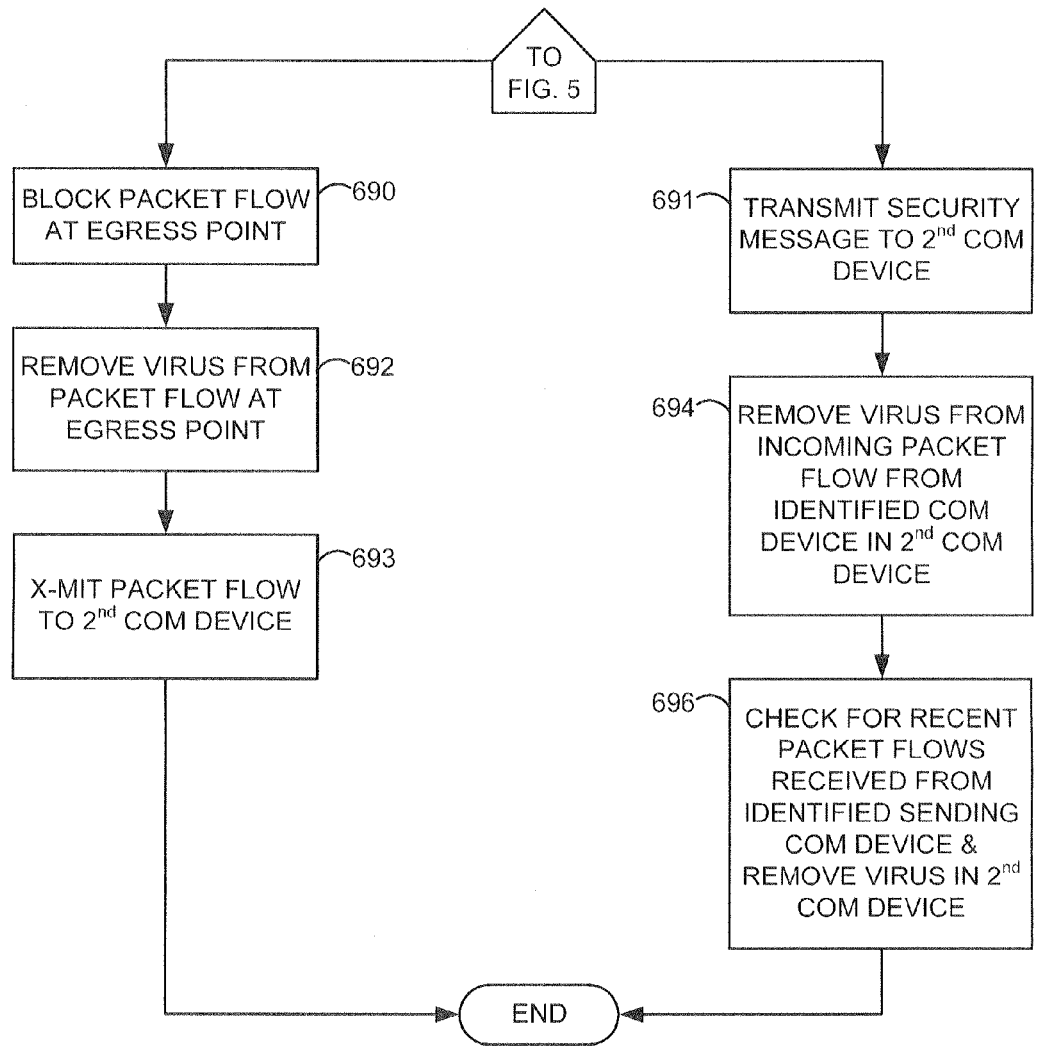
FIG. 6 illustrates the operation of a communication system in an embodiment of the invention.

FIGS. 5 and 6 illustrate the operation of communication system 400 in an embodiment of the invention. The reference numbers from FIGS. 5 and 6 are indicated parenthetically below. Ingress point 410 receives a packet flow (555) and copies the packet flow (560). Ingress point 410 then transmits the packet flow to one of egress points 420-423 (570) and processes the copy of the packet flow to determine if the packet flow represents a security event (565).

If the packet flow represents a security event (575), then ingress point 410 transmits an alarm instruction comprising a blocking instruction, a destination address, an identity of a sending communication device, and an identity of a receiving communication device to routing system 440 (580). Routing system 440 translates the destination address to identify the proper one of egress points 420-423 (581). Routing system 440 then transmits the blocking instruction and the identities of the sending and receiving communication devices to the proper one of egress points 420-423 (582).

If no blocking instruction is received at the proper one of egress points 420-423 (585), then the proper one of egress points 420-423 transmits the packet flow to communication device 425 (595). If a blocking instruction is received at the proper one of egress points 420-423 (585), then (in FIG. 6) the proper one of egress points 420-423 blocks the corresponding packet flow (690) and transmits a security message to communication device 425 (691).

If the security event comprises a virus, then the proper one of egress points 420-423 processes the packet flow to remove the virus from the packet flow (692), and the packet flow is then transmitted to communication device 425 (693).

After communication device 425 receives the security message, communication device 425 processes any incoming packet flow from the identified sending communication device for virus removal for a period of time (694). Communication device 425 also checks for recent packet flows received from the identified sending communication device and, if found, then processes the packet flow to remove the virus from the packet flow (696).

Figure 7:
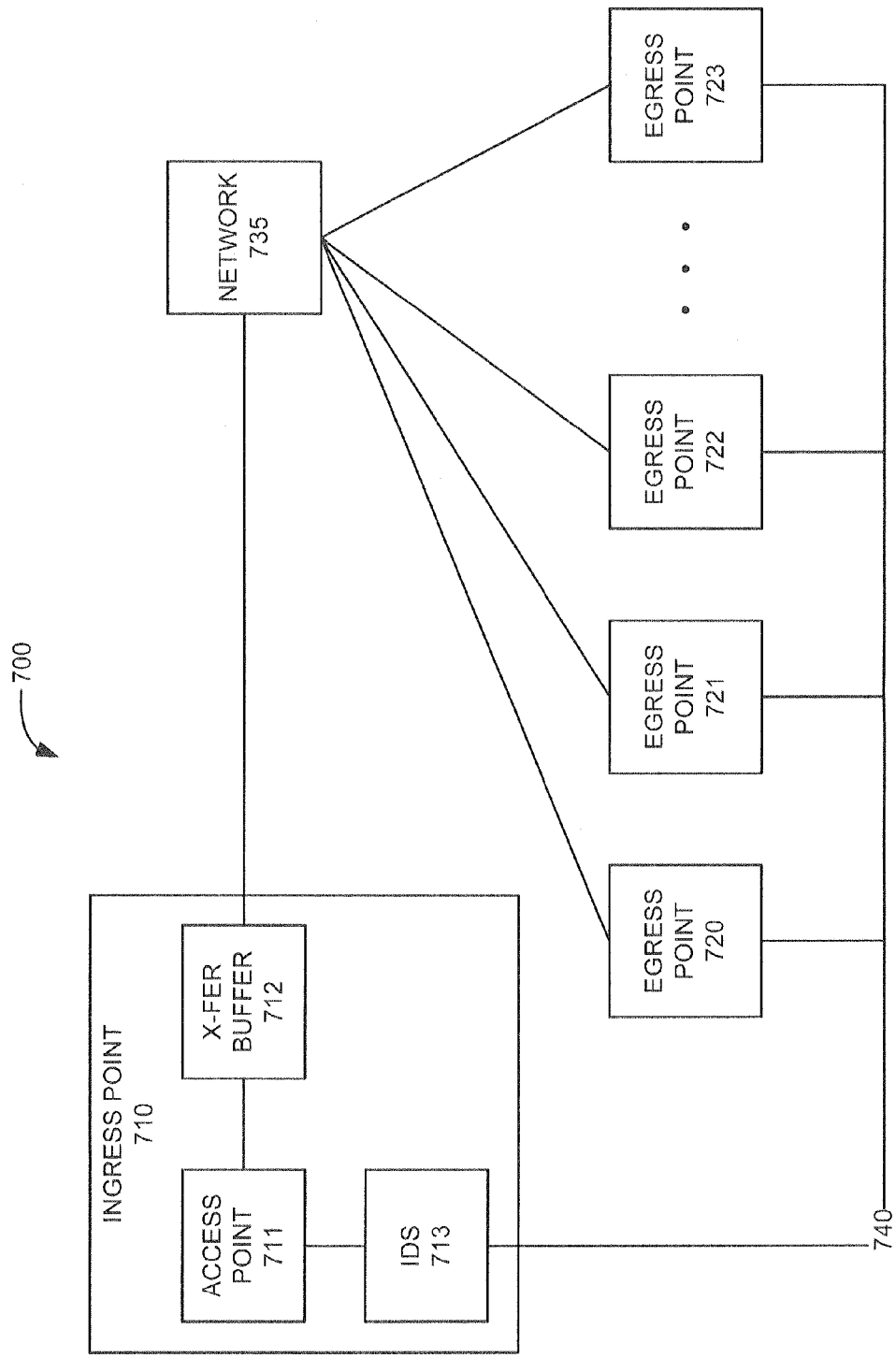
FIG. 7 illustrates a communication network in an embodiment of the invention.

FIG. 7 illustrates communication network 700 in an embodiment of the invention. Communication network 700 comprises ingress point 710, network 735, and egress points 720-723. Ingress point 710 comprises access point 711, transfer buffer 712, and IDS 713. Access point 711 is linked to transfer buffer 712 and IDS 713. Transfer buffer 712 communicates with egress points 720-723 via network 735. IDS 713 communicates with egress points 720-723 over alarm link 740.

If a security event is detected in a packet flow, then IDS 713 translates a destination address to identify the proper egress point and then transmits a blocking instruction, an identity of a sending communication device, and an identity of a receiving communication device to one of egress points 720-723 over alarm link 740. Alarm link 740 comprises a direct link from ingress point 710 to a plurality of egress points in communication network 700.

In some embodiments, IDS 713 transmits the blocking instruction and the identities of the communication devices to a plurality of egress points in communication network 700 over direct alarm link 740. Each egress point then blocks all packet flows associated with the identified communication device pair for a period of time.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication network having an ingress point and an egress point to detect security events in packet flows, the method comprising:
   at the ingress point, receiving a packet flow from a first communication device;
   copying the packet flow, transmitting the packet flow to the egress point over a network path, and processing the copy to determine if the packet flow represents a security event, wherein the security event comprises a virus;
   if the packet flow represents the security event, then transmitting a blocking instruction for the packet flow to the egress point over an alarm link that is faster than the network path, wherein the blocking instruction reaches the egress point before the packet flow reaches the egress point, and at the egress point, blocking the packet flow representing the security event, processing the packet flow representing the security event to remove the virus from the packet flow, resulting in a clean packet flow, transmitting the clean packet flow to a second communication device, and transmitting a security message to the second communication device, wherein the security message instructs the second communication device to determine whether recent packet flows were previously received from the first communication device, and if the recent packet flows were previously received from the first communication device, process the recent packet flows to remove the virus from the recent packet flows; and
   if the packet flow does not represent the security event, then at the egress point, transmitting the packet flow to the second communication device.

2. The method of claim 1 wherein transmitting the blocking instruction to the egress point comprises translating a destination address of the packet flow at the ingress point to identify the egress point.

3. The method of claim 1 wherein transmitting the blocking instruction to the egress point comprises:
   transmitting an alarm instruction indicating a destination address of the packet flow to a routing system;
   translating the destination address in the routing system to identify the egress point; and
   transmitting the blocking instruction from the routing system to the egress point.

4. The method of claim 1 wherein transmitting the blocking instruction to the egress point comprises transmitting an identity of the first communication device and an identity of the second communication device.

5. The method of claim 1 further comprising transmitting an additional blocking instruction for the packet flow to an additional egress point.

6. The method of claim 1 wherein the security message indicates the identity of the first communication device.

7. The method of claim 1 wherein the security message comprises a virus removal application.

8. A communication system comprising:
   an ingress point configured to receive a packet flow from a first communication device, copy the packet flow, transmit the packet flow to an egress point over a network path, process the copy to determine if the packet flow represents a security event, wherein the security event comprises a virus, and if the packet flow represents the security event, transmit a blocking instruction for the packet flow to the egress point over an alarm link that is faster than the network path; and
   the egress point configured to block the packet flow representing the security event in response to receiving the blocking instruction, wherein the blocking instruction reaches the egress point before the packet flow reaches the egress point, process the packet flow representing the security event to remove the virus from the packet flow, resulting in a clean packet flow, transmit the clean packet flow to a second communication device, and transmit a security message to the second communication device, wherein the security message instructs the second communication device to determine whether recent packet flows were previously received from the first communication device, and if the recent packet flows were previously received from the first communication device, process the recent packet flows to remove the virus from the recent packet flows; and the egress point configured to, if the blocking instruction is not received, transmit the packet flow to the second communication device.

9. The communication system of claim 8 wherein the ingress point is configured to translate a destination address of the packet flow to identify the egress point.

10. The communication system of claim 8 wherein the security message indicates the identity of the first communication device.

11. The communication system of claim 8 wherein the security message comprises a virus removal application.

12. A communication system comprising:

an ingress point configured to receive a packet flow from a first communication device, copy the packet flow, transmit the packet flow over a network path, process the copy to determine if the packet flow represents a security event, wherein the security event comprises a virus, and if the packet flow represents the security event, transmit an alarm instruction indicating a destination address of the packet flow;

a routing system configured to receive the alarm instruction, translate the destination address to identify an egress point, and transmit a blocking instruction to the egress point over an alarm link that is faster than the network path, wherein the blocking instruction reaches the egress point before the packet flow reaches the egress point; and the egress point configured to block the packet flow representing the security event in response to receiving the blocking instruction, process the packet flow representing the security event to remove the virus from the packet flow, resulting in a clean packet flow, transmit the clean packet flow to a second communication device, and transmit a security message to the second communication device, wherein the security message instructs the second communication device to determine whether recent packet flows were previously received from the first communication device, and if the recent packet flows were previously received from the first communication device, process the recent packet flows to remove the virus from the recent packet flows; and the egress point configured to, if the blocking instruction is not received, transmit the packet flow to the second communication device.

13. The communication system of claim 12 wherein the routing system is configured to transmit an identity of the first communication device and an identity of the second communication device.

14. The communication system of claim 12 wherein the routing system is configured to transmit an additional blocking instruction for the packet flow to an additional egress point.

15. The communication system of claim 12 wherein the security message indicates the identity of the first communication device.

16. The communication system of claim 12 wherein the security message comprises a virus removal application.

\* \* \* \* \*